Figure 1:
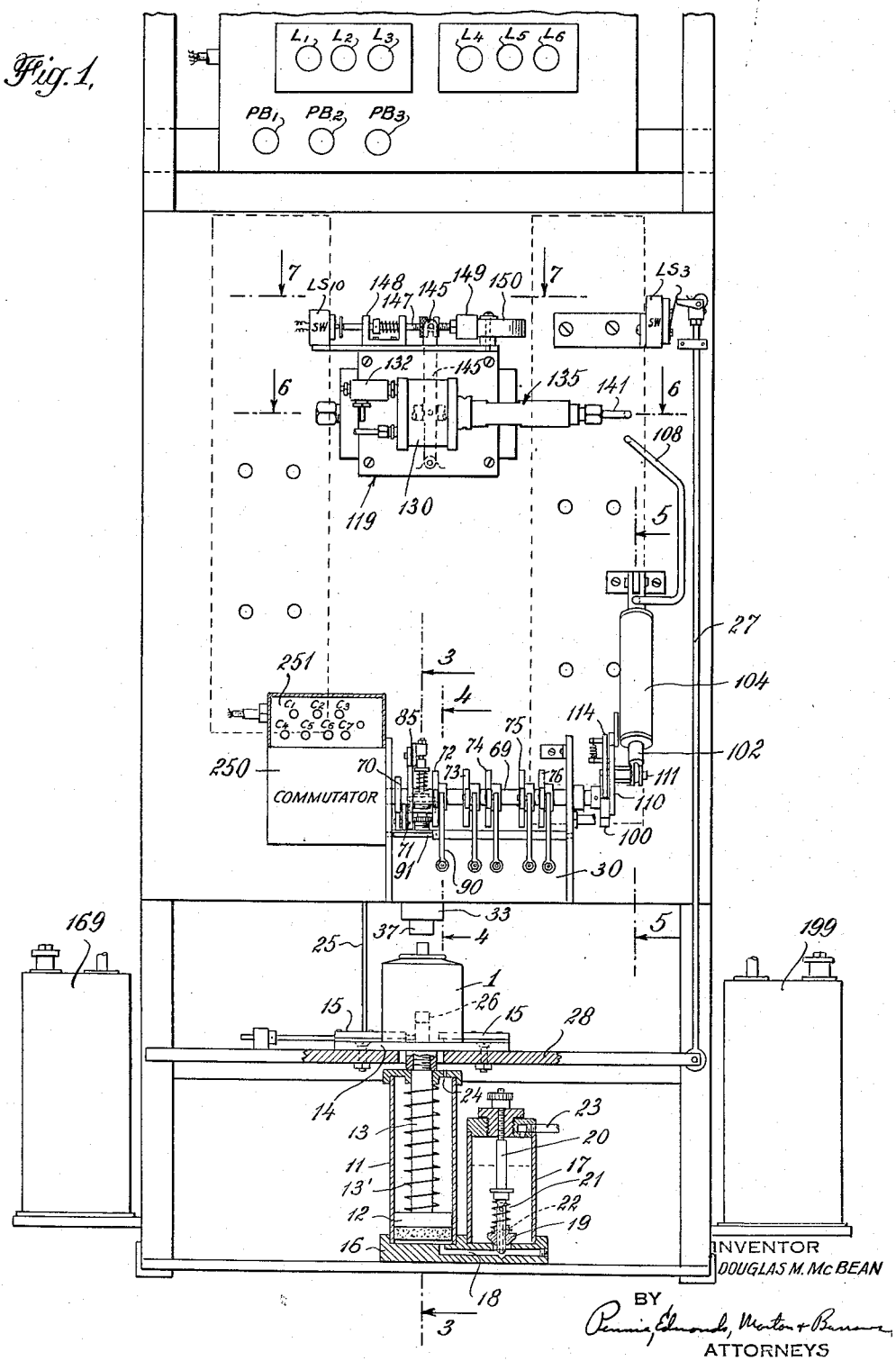

Dec. 8, 1953 D. M. McBEAN 2,661,885
APPARATUS FOR CHARGING LIQUID PRODUCTS AND VOLATILE
PROPELLENTS INTO PRESSURE CONTAINERS
Filed March 4, 1950 8 Sheets-Sheet 1

INVENTOR
DOUGLAS M. McBEAN
BY
Pennie, Edmonds, Morton & Barrows
ATTORNEYS

Dec. 8, 1953           D. M. McBEAN           2,661,885
APPARATUS FOR CHARGING LIQUID PRODUCTS AND VOLATILE
PROPELLENTS INTO PRESSURE CONTAINERS
Filed March 4, 1950           8 Sheets-Sheet 2
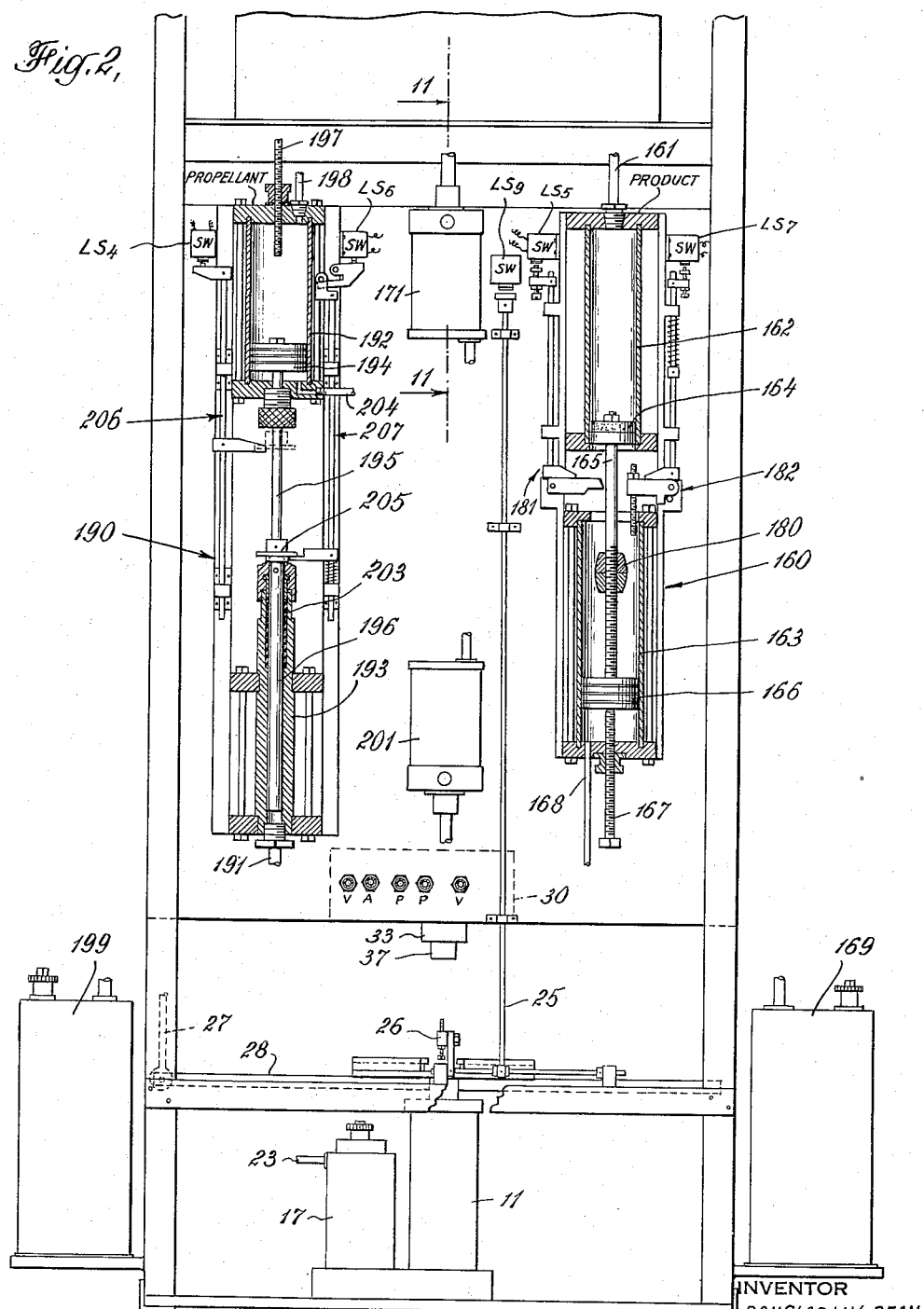

Dec. 8, 1953  D. M. McBEAN  2,661,885
APPARATUS FOR CHARGING LIQUID PRODUCTS AND VOLATILE
PROPELLENTS INTO PRESSURE CONTAINERS
Filed March 4, 1950  8 Sheets-Sheet 3
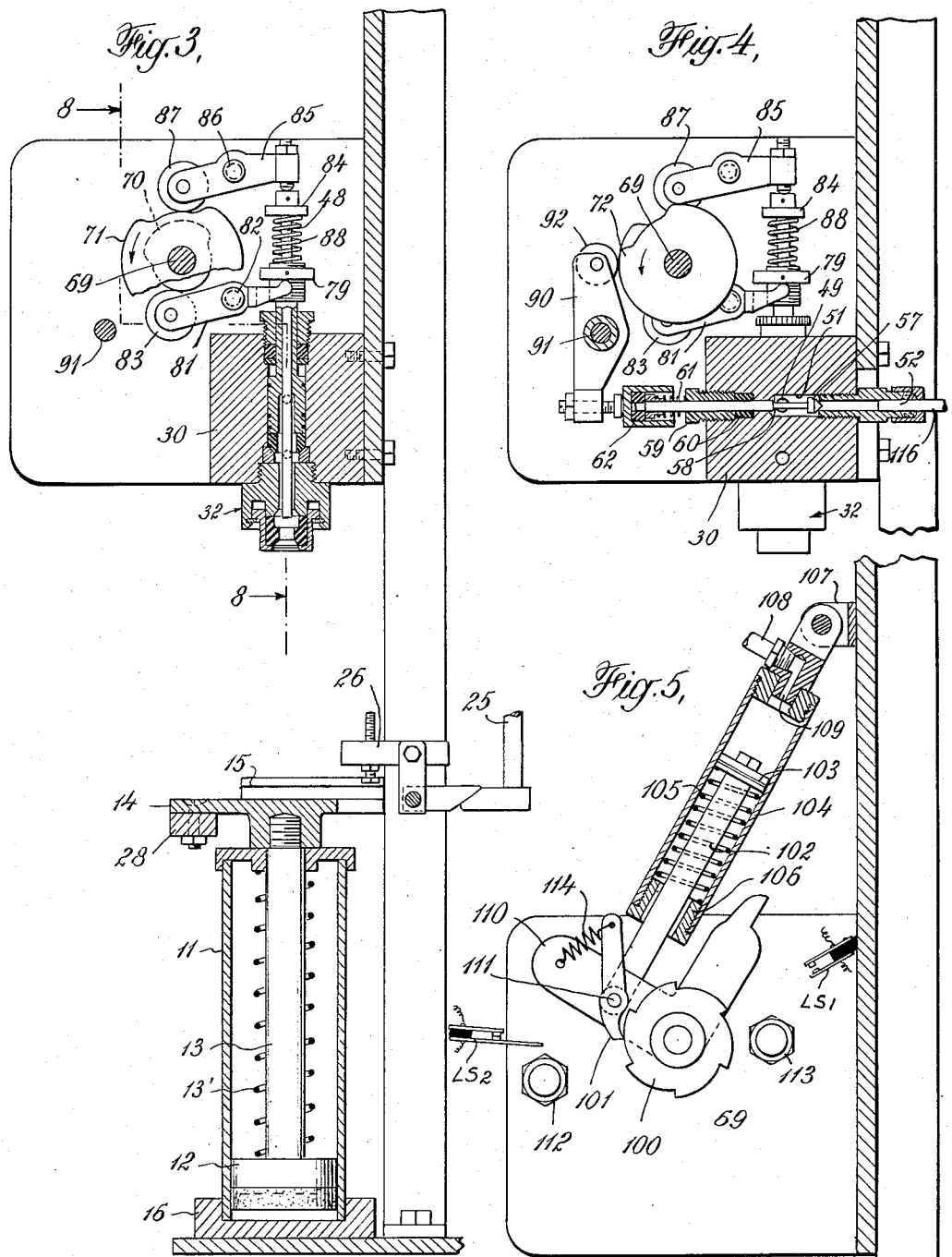
INVENTOR
DOUGLAS M. McBEAN
BY
ATTORNEYS

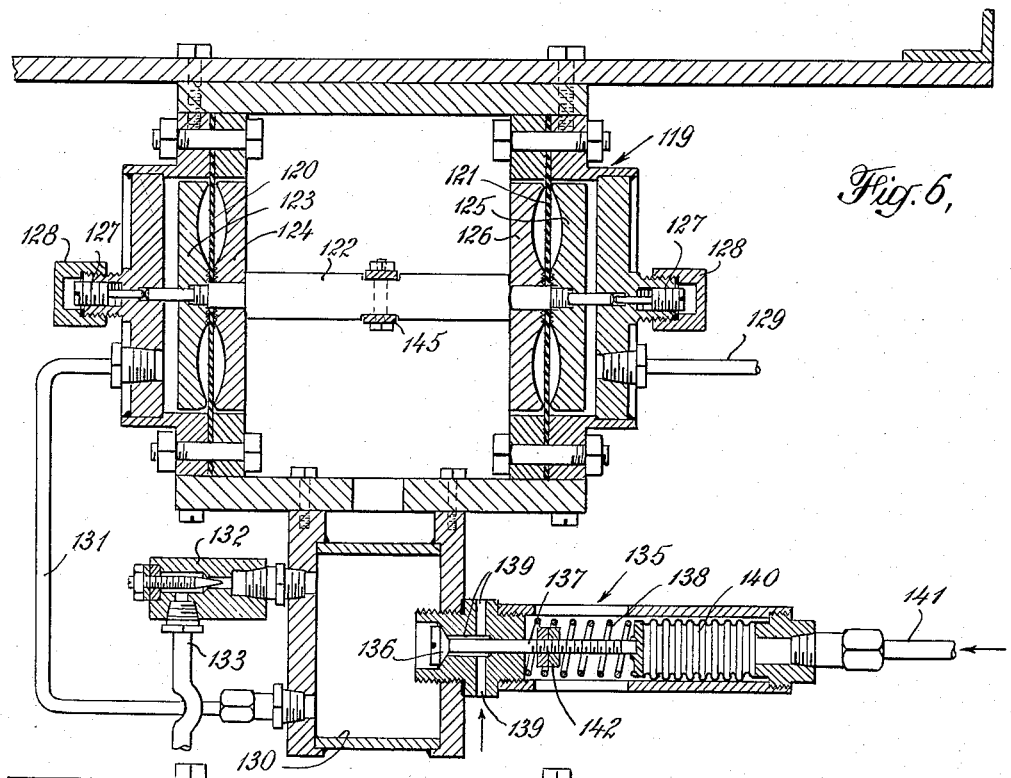
Fig. 6,
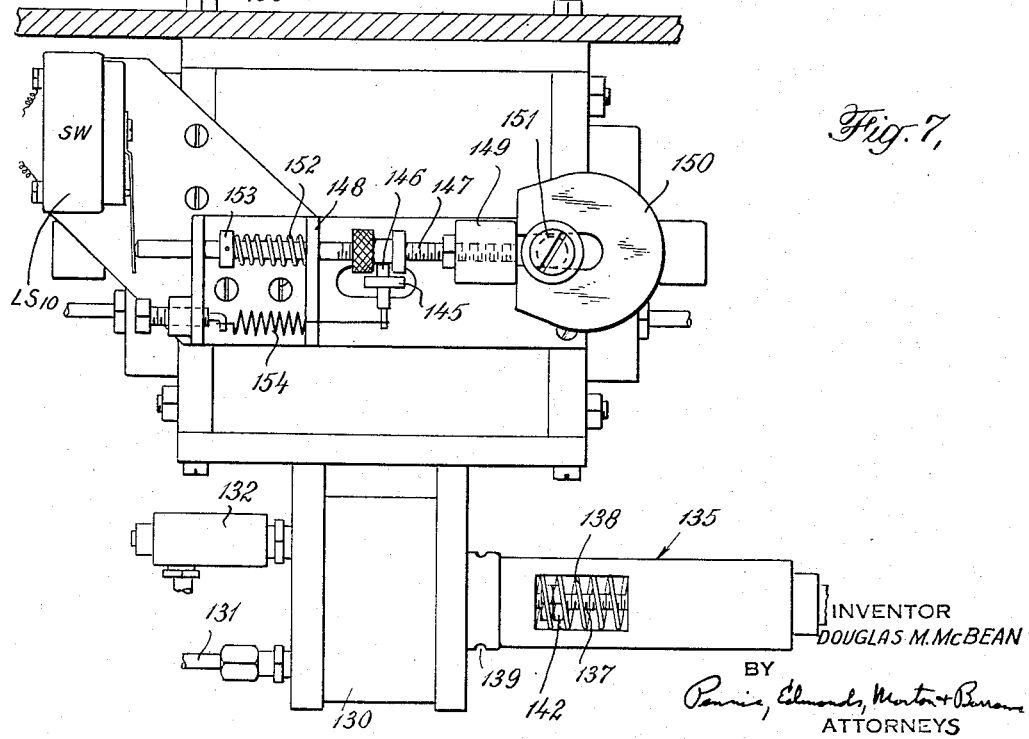
Fig. 7,
INVENTOR
DOUGLAS M. McBEAN
BY
ATTORNEYS

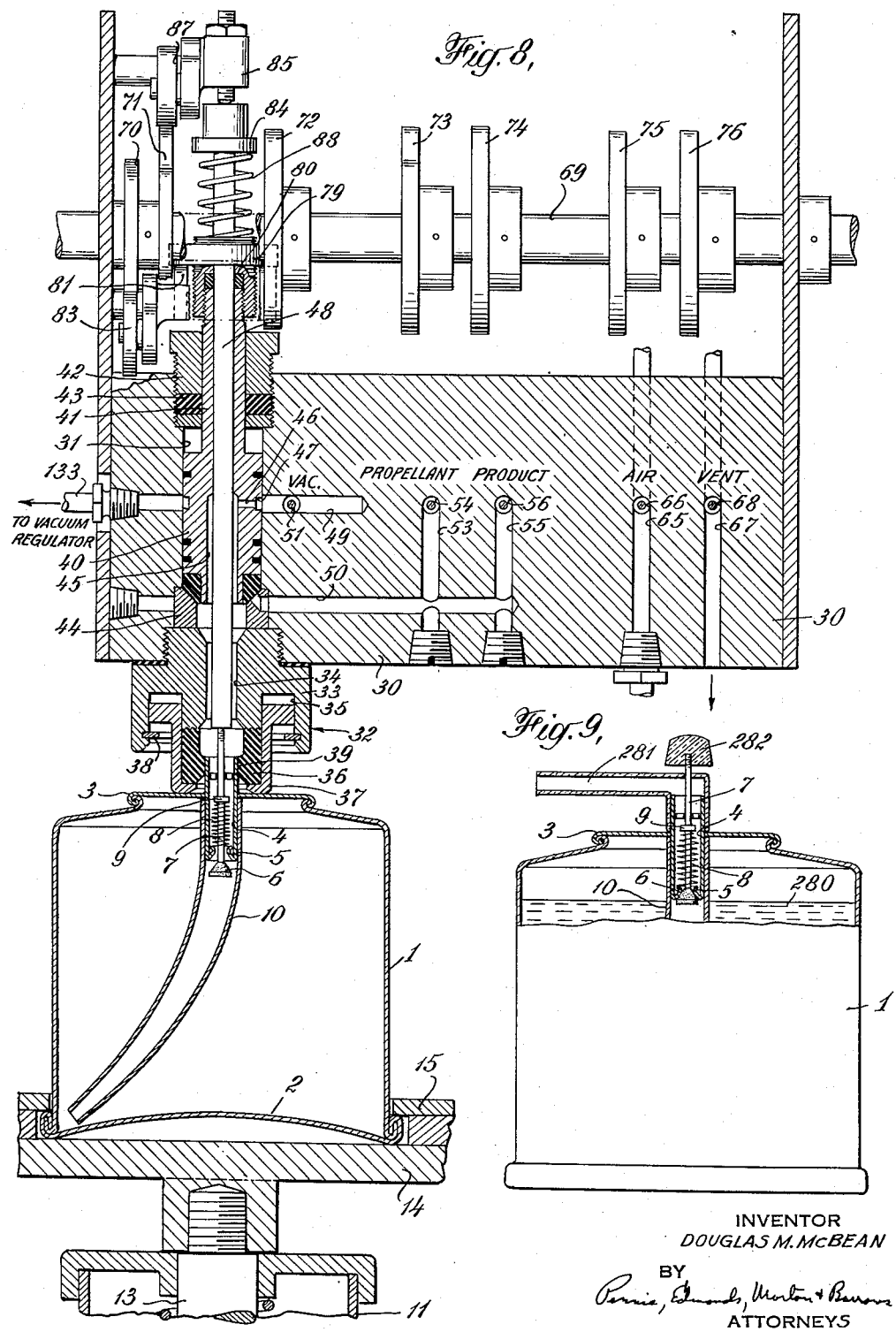

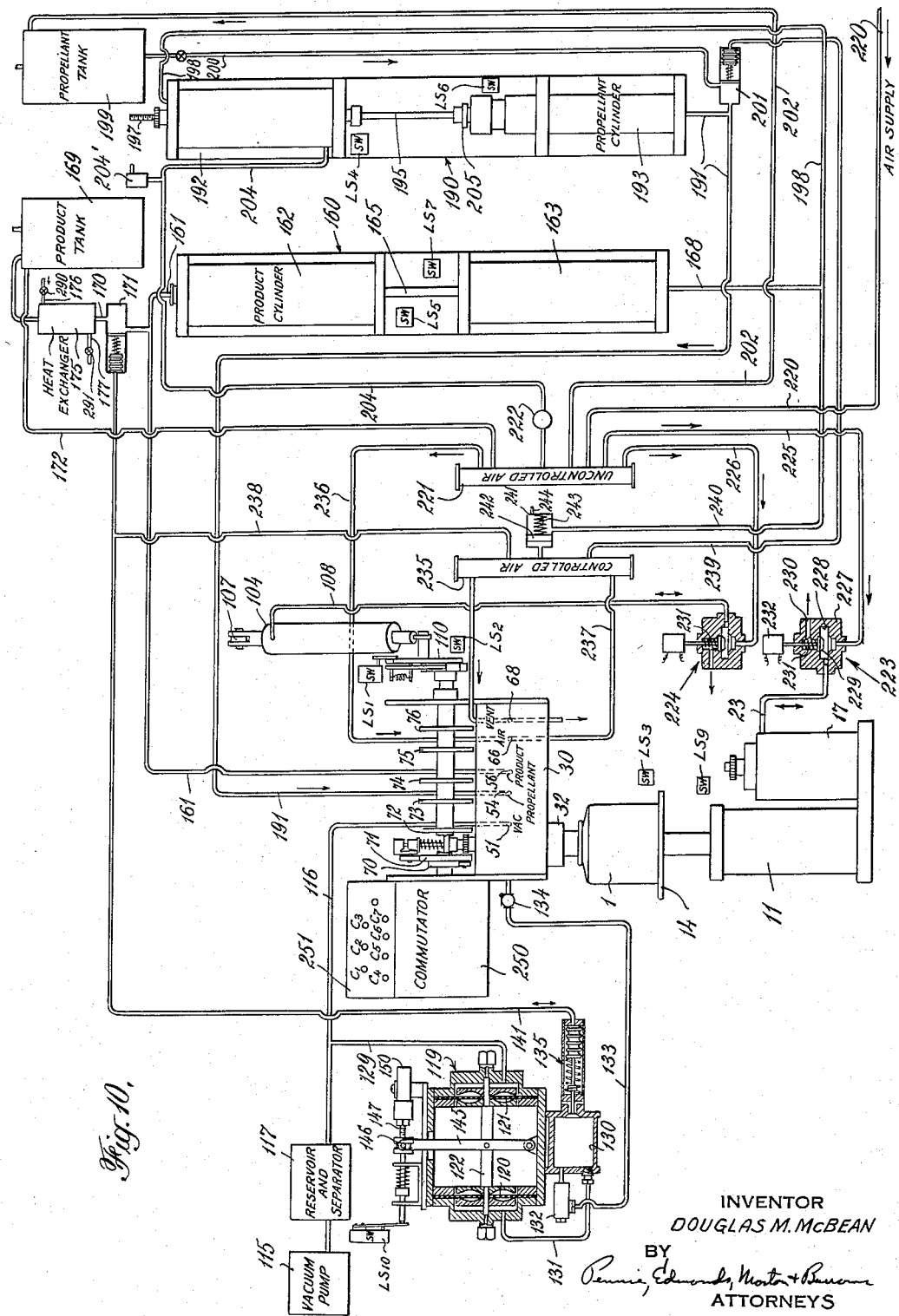

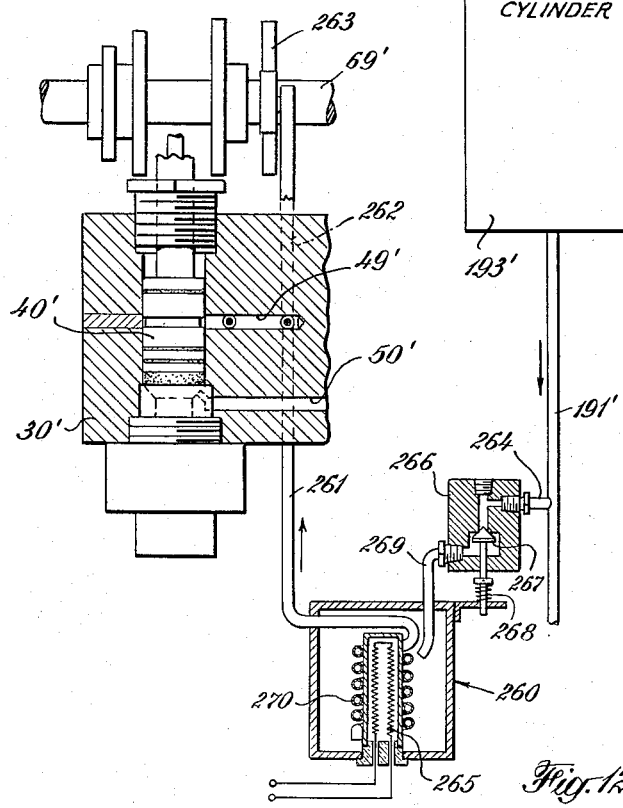
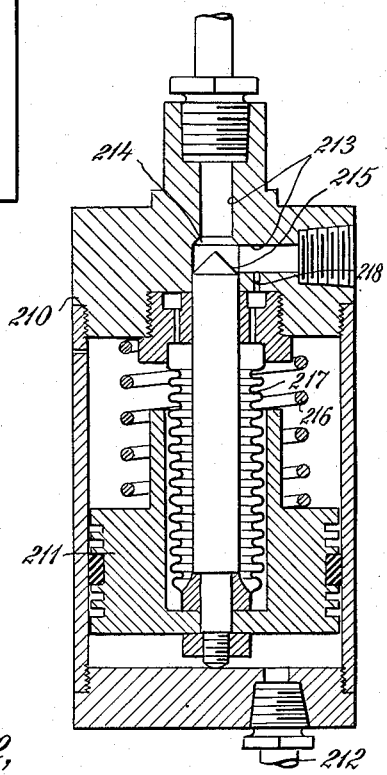
| SEQUENCE OF OPERATION | | | | | | | |
|---|---|---|---|---|---|---|---|
| CAN VALVE | | | | OPEN | | | |
| SLEEVE VALVE | | | | UP | | | |
| VACUUM VALVE | | OPEN | | | | | |
| LIQUID PROPELLANT | | | | OPEN | | | |
| PRODUCT VALVE | | | | OPEN | | | |
| COMPRESSED AIR | | | | OPEN | | | |
| VENT VALVE | OPEN | | | | | | OPEN |
| DEGREE ROTATION | 360 | 60 | 120 | 180 | 240 | 300 | 360 |
| STATION | 6 | 1 | 2 | 3 | 4 | 5 | 6 |
INVENTOR
DOUGLAS M. McBEAN
BY
ATTORNEYS

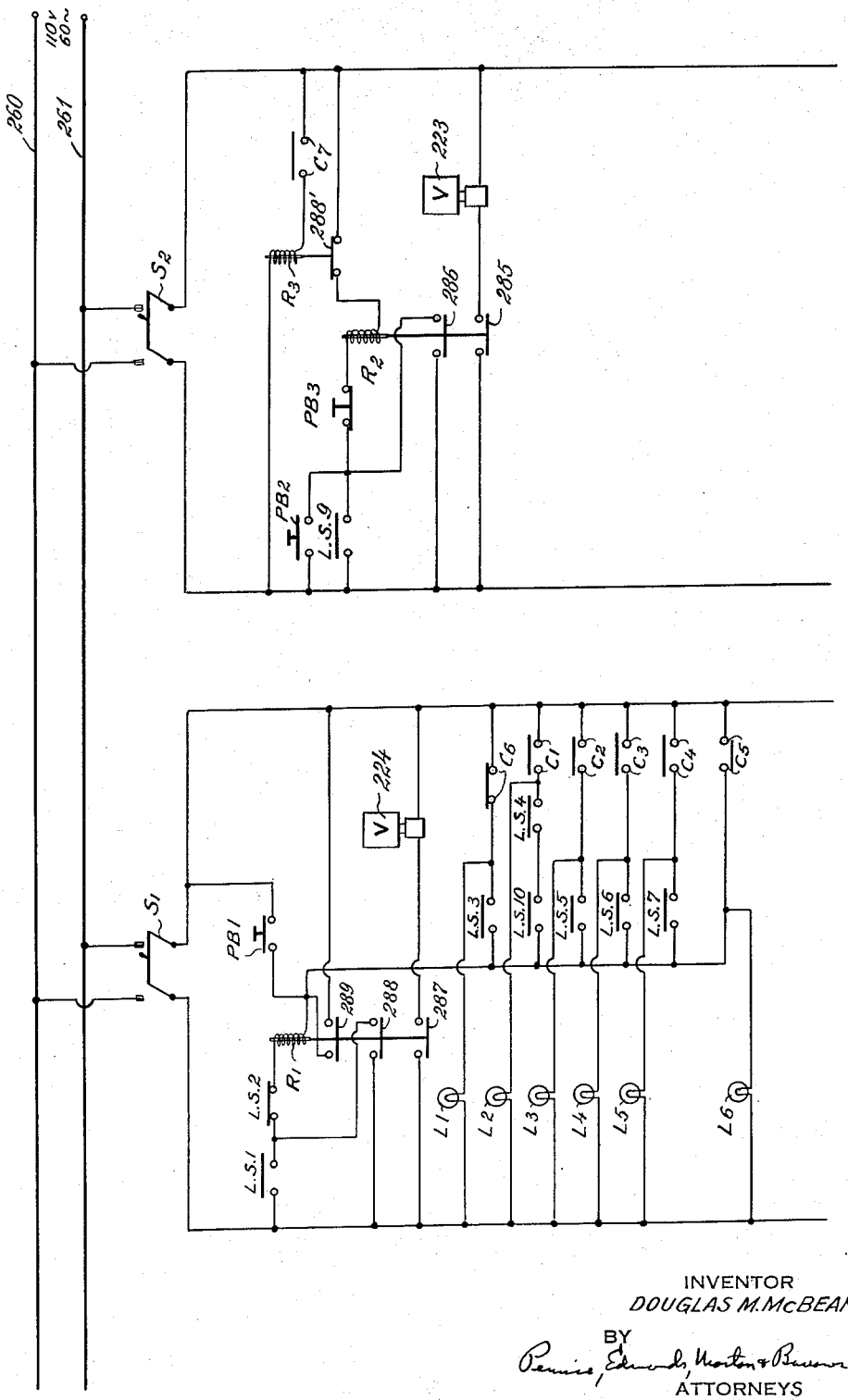

Patented Dec. 8, 1953

2,661,885

UNITED STATES PATENT OFFICE 2,661,885

APPARATUS FOR CHARGING LIQUID PRODUCTS AND VOLATILE PROPELLANTS INTO PRESSURE CONTAINERS

Douglas M. McBean, Rochester, N. Y., assignor to Carter Products, Inc., a corporation of Maryland Application March 4, 1950, Serial No. 147,588

24 Claims. (Cl. 226—70)

1

This invention relates to apparatus for the filling of fluids, including volatile propellants and liquid products to be propelled, into pressure-tight containers. More particularly the invention is concerned with apparatus for such filling of pressure-tight containers when the liquid product to be filled into the containers is an aqueous liquid product. The apparatus here involved is one by which the method of filling disclosed in my co-pending application Ser. No. 131,802, filed December 8, 1949, may be carried out.

As set forth in my co-pending application it has heretofore been customary in the packaging of materials, including volatile propellants, in pressure-tight containers, to fill and close the container at atmospheric pressure, keeping the temperature of the material to be packed below a temperature at which the vapor pressure of the propellant is greater than the prevailing atmospheric pressure. By a volatile propellant I mean a compound having a vapor pressure appreciably above atmospheric pressure at normal room temperature. When the product to be packaged comprises or includes water or an aqueous solution or suspension, filling at low temperature is unsatisfactory because the temperature required to maintain the useful propellants in liquid phase at atmospheric pressure is below the freezing temperature of the product or the water or aqueous solution therein. Thus, in filling at temperatures low enough to keep the useful propellants in liquid phase, the product freezes and the mixing of the product and propellant is prevented. The container must therefore be subsequently heated and agitated in order that a proper mixing of the product and propellant be accomplished. This procedure is unsatisfactory both because of the time involved in accomplishing mixing by heating and agitating the container and because of the fact that, despite the heating and agitating, a satisfactory mixing is not uniformly accomplished. In addition, the refrigeration and heating required for freezing and subsequent mixing, respectively, involve considerable expense.

Another difficulty involved in the above method of filling containers by freezing the product therein is that of inserting a syphon tube and a valve, with which the pressure-tight containers must be provided, in the container, while the liquid product therein is frozen. In order to do so, it is necessary to freeze the liquid in the container in a very definite tilted position so that the syphon tube may be properly located.

2

If the container is filled with the maximum quantity of liquid product, it is almost impossible to insert the tube while the material is in frozen condition.

It is the object of the present invention to provide an apparatus for charging an aqueous liquid product and a volatile propellant into a pressure-tight container with considerable speed and without resorting to the undesirable features of the freezing method set forth above. The apparatus contemplated performs its filling operation entirely automatically, once an empty pressure-tight container has been placed in position to be filled by the apparatus, and can accomplish the filling of the container in a period of time as small as six seconds. The apparatus primarily involves means for concurrently introducing the liquid product and the volatile propellant into the pressure-tight container. In general it comprises a metering device for introducing a measured charge of liquid product into the container through a valve controlled opening therein and a metering device for introducing a measured charge of propellant in liquid phase into the container through the same valve controlled opening during the introduction of the liquid product, that is, after the beginning and before the end of the introduction of the liquid product. The apparatus also includes, when desirable, means for heating the liquid product prior to its introduction into the container and/or means for superheating a portion of the measured charge of the propellant to superheated gaseous phase and for introducing it into the container after the completion of the introduction of the liquid product and the propellant in liquid phase. Prior to the introduction of either the liquid product or the volatile propellant, the pressure-tight container is evacuated by an evacuating means which includes a vacuum regulating device for regulating the degree to which the container is to be evacuated. The operation of the apparatus is accomplished primarily by compressed air and electricity.

For a more detailed description of one type of apparatus, which falls within the scope of my invention, reference may be made to the accompanying drawings in which:

Fig. 1 is a front elevation, partly in section, of the assembled apparatus,

Fig. 2 is a rear elevation of the assembled apparatus, showing in section the product and propellant metering devices, Figs. 3 and 4 are enlarged sectional views taken along lines 3—3 and 4—4, respectively, of Fig. 1 and show more clearly the structure of, and cam operating means for, certain of the valves of the apparatus, Fig. 5 is an enlarged sectional view taken along line 5—5 of Fig. 1, and shows the air operated means for indexing the cam shaft, Fig. 6 is an enlarged sectional view taken along 6—6 of Fig. 1 and shows the construction of the vacuum regulating device, Fig. 7 is an enlarged plan view of the vacuum regulating device and is taken along line 7—7 of Fig. 1, Fig. 8 is an enlarged sectional view taken along line 8—8 of Fig. 3 and shows the valve block of my apparatus with an empty container secured thereto by a pressure-tight coupling device, Fig. 9 is an elevation, partly in section, of a filled container provided with an outlet nozzle and valve-operating push button, Fig. 10 is a diagrammatic representation of the entire apparatus, Fig. 11 is an enlarged sectional view of one air operated check valve, taken along line 11—11 of Fig. 2, Fig. 12 is a table setting forth the sequence of operation of the apparatus, Fig. 13 sets forth, partly in section, a modification of my apparatus consisting of a means for superheating a portion of the measured charge of propellant to gaseous phase, and Fig. 14 is an across-the-line circuit diagram, setting forth in simplified from the various electrical circuits of the apparatus.

In Fig. 8 of the drawings a typical packaging and pressure-tight container is illustrated in section as having a body portion 1 and a suitably attached concave bottom wall 2. An outlet valve is secured in an opening in the top wall 3 of the container by a pressure-tight seal or connection. The valve shown comprises a tube 4 having an inturned flange 5 at its inner end, which forms a valve seat. A valve plug 6 carried by a valve stem 7 is resiliently held in engagement with the valve seat 5 by a spring 8 which is compressed between the flange 5 and a stop 9 struck from the stem 7. A siphon tube 10 of suitable material is fitted over the lower end of tube 4 within the container and extends to a point near the juncture of the side and bottom walls 1 and 2 of the container. Such a positioning of the lower end of tube 10 assures expulsion of substantially all of the contents of the filled container when it is used.

The container 1 is adapted to be supported during the filling operation by a hydraulic lift illustrated in section in Fig. 1. The lift comprises a cylinder 11 in which there is reciprocably mounted a piston 12 which supports a piston rod 13 extending upwardly therefrom through the upper end of cylinder 11. A spring 13', surrounding piston rod 13, is provided to urge piston 12 toward its lowest position. A platform or table 14 is supported on the upper end of piston rod 13 and is provided with guide members 15 by which a container may be quickly and accurately positioned on the platform for filling. Cylinder 11 is supported on a base 16 which also supports a fluid-containing cylinder 17. The interior of cylinder 17 is connected to the interior of cylinder 11 below piston 12 therein by a passageway 18 through the base support 16. A valve member 19 is supported on a valve stem 20 within cylinder 17 and is normally urged by a spring 21 downwardly to close the entrance of passageway 18 into the cylinder. The lower portion of valve stem 20 is provided with longitudinal passageway 22 which places the interior of cylinder 17 in communication with passageway 18 around valve 19. A compressed air conduit 23 leads into cylinder 17 at the upper end thereof to supply compressed air to the interior of cylinder 17 above the level of the fluid therein. When compressed air is admitted through conduit 23, fluid passes through passageway 22 in the valve stem into passageway 18 and thus into cylinder 11 below the piston 12 therein causing the piston to rise, thereby forcing platform 14 upwardly to lift a container supported thereby. A vent 24 in the head of cylinder 11 permits air above piston 12 to escape when the piston is moved upwardly. Because of the size of passageway 22 in the valve stem 20 of valve 19 the flow of fluid from cylinder 17 to cylinder 11 is fairly slow, thereby resulting in a slow upward movement of piston 12 and platform 14. However, when, as will subsequently be described, cylinder 17 is vented through conduit 23, piston 12 will move downwardly more rapidly under the urging of spring 13' because valve 19 in cylinder 17 will open against spring 21, thus permitting a more rapid return of the fluid to cylinder 17. The supplying of air to cylinder 17 through conduit 23 will be more fully described below but it is brought about initially by properly positioning a container 1 on platform 14 of the hydraulic lift, whereupon the container closes a limit switch LS9 (Fig. 2) through a linkage mechanism 25 by striking member 26 of the linkage mechanism. For a purpose which will also be described below, a normally open limit switch LS3 (Fig. 1) will be closed by a linkage mechanism 27, including a member 28 secured to the underface of platform 14 of the hydraulic lift, when the platform is raised by the hydraulic lift to its upper position.

A valve block 30, seen most clearly in section in Fig. 8, is positioned above the hydraulic lift. It has a valve chamber 31 formed therein, the lower end of which is provided with a coupling device indicated generally at 32 by which a container may be connected to the valve block in such a way that its interior may be placed in communication with valve chamber 31 in pressure-tight relation thereto. The coupling device 32 comprises a body portion 33 having a central opening 34 extending therethrough and concentric with valve chamber 31. An annular channel 35 is formed in the lower face of body portion 33 concentric with and surrounding central opening 34. A gasket 36 of rubber or other suitable material is supported on the annular shoulder between opening 34 and channel 35 by an annular compressor member 37 in the general form of a cup with a flanged rim. The flanged rim of the compressor member is received in channel 35, being adapted to slide in and out therein. The lower end of the compressor member is flanged inwardly to embrace the lower end of gasket 36 and to thereby support it. A ring member 38 is mounted in the outer wall of channel 35 to prevent the compressor member from falling downwardly out of the channel. The gasket 36 is also provided with a central opening 39 extending therethrough and concentric with opening 34. When a container 1 is elevated by the hydraulic lift, the upper end of its tube 4 enters the opening in the gasket and its upper wall 3 engages the lower end of compressor member 37, thereby urging it upwardly to compress the gasket 36 and cause it to deform and be forced against tube 4, thereby forming a pressure-tight seal.

A piston or sleeve type valve element 40 (Fig. 8) is reciprocably mounted in valve chamber 31 of block 30 and is supported by a valve stem 41 extending upwardly through a central opening in a plug 42, which effectively closes the upper end of valve chamber 31. Packing 43 is provided to make valve chamber 31 air tight. A valve seat 44 is positioned in the lower end of valve chamber 31 above coupling device 32, and is adapted to receive the lower end of valve element 40. An opening 45 extends longitudinally and centrally through the valve element 40 and valve stem 41. The lower end of this opening is of a somewhat larger diameter than is its upper end which passes through the valve stem. A transverse passageway 46 extends from the upper end of the enlarged portion of opening 45 radially outwardly therefrom to an annular channel 47 in the outer face or periphery of the valve element. A container valve actuating member 48 extends through the central opening 45 of valve 40 and valve stem 41 downwardly through opening 34 of coupling device 32 to abut the upper end of valve stem 7 of the container 1. When member 48 is moved downwardly to the position shown in Fig. 8, it opens valve 6 of the container against the pressure of spring 8. Valve element 40 is adapted to place alternately in communication with the valve chamber 31, passageways 49 and 50 of the valve block which are respectively the passageways for evacuating the container and for introducing the liquid product and the propellant into the container. When the valve element 40 is in its lower position, passageway 50 is closed off from the valve chamber 31. Passageway 49 is, in this position of the valve, in communication with the interior of the container by means of annular channel 47, transverse passageway 46, longitudinal passageway 45, etc., providing of course that the container valve is open. When the valve 40 is in its upper position, passageway 49 is sealed off and passageway 50 is placed in communication with the valve chamber 31 and with the interior of the container. A branch passageway 51 is formed in valve block 30 and leads from passageway 49 to an evacuating conduit 52 (Fig. 4). Passageway 50 of the valve block, through which liquid product and volatile propellant in liquid phase are supplied to valve chamber 31 and thence to the interior of container 1, is in communication with a liquid product supply conduit and a volatile propellant supply conduit through branch passageways 54 and 53, and branch passageways 56 and 55, respectively.

Each of branch passageways 51, 54 and 56 is provided with a cam operated valve to close or open it as may be desired. One type of valve, which is suitable for this purpose and used in evacuating passageway 51, is shown in Fig. 4 and comprises a valve 57 mounted on a valve stem 58 which extends from the block through a plug 59 and packing 60. This valve is normally urged toward open position by a spring 61 compressed between plug 59 and a collar head 62 on the outer end of the valve stem. While the valve controlling the evacuating passageways of the valve block is, as shown in Fig. 4, normally urged toward open position, a valve acting in the opposite direction might as readily be used, that is, one in which the valve element is reversed and which is normally spring urged towards closed position. It has been found, however, that it is advantageous in the evacuating passageways to use the type of valve shown, while in passageways 54 and 56 it is advantageous to use the alternate type, that is, valves in which the valve elements are reversed, the valve seats are formed to the left of the valve elements as seen in Fig. 4, and therefore the valves are normally spring urged towards closed position.

Valve block 30 (Fig. 8) also contains compressed air passageways 65 and 66 and vent passageways 67 and 68 for purposes to be explained below. Passageways 66 and 68 are preferably provided with the same type of valves as are passageways 54 and 56.

By reference to Figs. 3–5 and 8, the operating mechanism for the various valves referred to will be described. This operating mechanism comprises a cam shaft 69 upon which are mounted and fixedly secured cams 70—76. Cams 70 and 71, respectively, control the operation of sleeve valve element 40 of the valve block and container valve operating member 48. By reference specifically to Figs. 3 and 8 it will be noted that a collar 79 is secured to the upper end of valve stem 41. This collar encloses a packing 80 which effectively seals the upper end of the opening 45 of the valve stem from the outer atmosphere. A rocker arm 81, pivotally supported on a pin 82, supports on one of its ends a cam follower 83, which rides on cam 70, and at its other end engages the lower surface of collar 79. The upper end of the valve operating member 48 is also provided with a collar, namely, collar 84. A rocker arm 85 is provided for the operation of valve operating member 48 and is pivotally mounted on a pin 86 and has at one end a cam follower 87 which rides on cam 71 and at its other end acts downwardly on member 48. A spring 88 is compressed between collars 79 and 84. Because rocker arm 85 limits the upward movement of member 48 and therefore the upward movement of collar 84, spring 88 serves the purpose of constantly urging collar 79 and therefore valve stem 41 and valve element 40 downwardly. Thus, valve 40 is normally in its lower position. However, when cam 70 has been rotated to a certain position, rocker arm 81 will be urged in a counterclockwise direction, as seen in Fig. 3, thereby raising collar 79 against the action of spring 88, thus moving valve element 40 to its upper position. When cam 71 is rotated from the position shown in Fig. 3, rocker arm 85 will be moved in a clockwise direction, thereby moving valve operating member 48 downwardly to its position, as shown in Fig. 8, to open the valve of the container 1.

Referring now to Fig. 4, the valve actuating mechanism for any of the valves of passageways 51, 54, 56, 66 and 68 may be seen. In this case, however, that for the valve of passageway 51 will be described. This comprises a cam 72 mounted on the same cam shaft 69 that supports cams 70 and 71. A rocker arm 90 is pivotally secured on a pin 91 and carries a cam follower 92 at one end which rides on cam 72, and at the other end engages the collar head member 62 supported by valve stem 58 of the valve. As previously stated, spring 61 of the valve normally urges the valve towards open position. Cam 72 and rocker arm 90 are provided to positively maintain the valve in closed position against the action of spring 61. The cam is effective to alter this condition by permitting rocker arm 90 to rotate in a clockwise direction, as seen in Fig. 4, during a portion of the rotation of the cam, thereby allowing the valve to be opened by its spring 61. Cams 73—76 act on similar rocker arms in a similar manner to control the valves in passageways 54, 56, 64 and 68. Whether or not these latter cams are operable to positively maintain the latter valves in closed position and to permit them to open at certain times or vice versa in the event that the latter valves function oppositely to that of Fig. 4, as suggested, is dependent entirely upon the type of valve used.

Referring now to Fig. 5, the apparatus by which the cam shaft 69 is indexed will be explained. A ratchet wheel 100 is fixedly mounted on the end of cam shaft 69 and is adapted to be rotated by a pawl 101. A piston rod 102, supported by a piston 103, mounted in a cylinder 104, is normally urged into the cylinder by a spring 105 supported between piston 103 and a plug 106 in the outer end of the cylinder. The inner end of the cylinder is pivotally supported by a bracket 107 and may be provided with compressed air through a conduit 108 and a passageway 109. Loosely mounted on cam shaft 69, adjacent ratchet wheel 100, is a bell crank 110, the arms of which are adapted to operate a pair of limit switches LS1 and LS2, limit switch LS2 being normally closed and limit switch LS1 being normally open. The effect of the operation of these limit switches will be described below. The pawl 101 is pivotally secured to bell crank 110, both being secured to the outer end of piston rod 102 by a pin 111. When air is admitted to the inner end of cylinder 104, piston 103 and piston rod 102 are forced outwardly in the cylinder, thereby rotating bell crank 110 and moving pawl 101 to turn cam shaft 69 through ratchet wheel 100. The ratchet wheel 100 is provided with six teeth from which it is clear that each operation of the pawl will turn the cam shaft through 1/6 of a revolution or 60 degrees. Stops 112 and 113 are provided to limit the rotation of the bell crank. A spring 114, secured to one arm of bell crank 110, has its other end secured to the upper end of pawl 101. The purpose of this spring is to maintain the lower end of the pawl in contact with the ratchet wheel, the pawl being loosely mounted on pin 111. In the position shown the pawl is being returned to its rest position after having been moved to index the cam shaft.

A vacuum pump 115 (Fig. 10) is provided for evacuating the container 1 and is connected to the evacuating passageways of the valve block by a conduit 116 which connects with conduit 52 (Fig. 4). A reservoir tank and separator 117 is connected in conduit 116 between the vacuum pump and the valve block. The purpose of the reservoir tank and separator 117 is two-fold. First, it is used in order that the vacuum pump 115 need not be operated continuously. This is so, because it is relatively so much larger in volume than a container that is to be filled that the air taken from the container, when added to it, will not appreciably change the degree of vacuum within it. Secondly, it is provided so that any product or propellant withdrawn through the vacuum line 116 will be caught in the separator and prevented from reaching the pump.

As seen most clearly in Figs. 6 and 7, though it appears also in Figs. 1 and 10, a vacuum regulating device is provided to assure the evacuation of containers to a predetermined and uniform degree. This is important if the containers are to be uniformly filled to a resultant pressure substantially equal to the vapor pressure of the volatile propellant and if they are to be approximately uniform in the amount of their contents. The vacuum regulating device comprises a box-like structure, indicated generally at 119. Two resilient diaphragms 120 and 121 are supported at opposite ends of the box-like structure, an air-tight chamber being formed between each diaphragm and the adjacent end of the box-like structure. A connecting rod 122 is supported between the diaphragms and is connected at one end to diaphragm 120 by members 123 and 124, one lying on each side of the diaphragm, and at the other end to diaphragm 121 by members 125 and 126, again one lying on each side of the diaphragm. Because of the resiliency of the diaphragms, the connecting rod is movable longitudinally. In order to limit such longitudinal movement thereof, the opposite ends of box 119 are provided with plugs 127, adjustable longitudinally of the connecting rod and adapted to be abutted by the ends of the connecting rod. In order to maintain the air-tight condition of the chamber between a diaphragm and its adjacent box end, a cap 128 is provided to surround the adjustable plug 127. The inner faces of the diaphragms are subject to atmospheric pressure, while the outer face of diaphragm 121 is subject to the pressure existing in vacuum conduit 116 by way of connecting conduit 129 (Fig. 10) and the outer face of diaphragm 120 is subject to the pressure of a vacuum chamber 130 through conduit 131. Chamber 130 is of substantially the same volume as is container 1, and is evacuated by the same means as is container 1, it being connected through a needle valve 132, conduit 133 and check valve 134 to valve chamber 31 of valve block 30 (Fig. 10). It will be noted from Fig. 8 that conduit 133 enters valve chamber 31 directly opposite evacuating passageway 49 of the valve block and is in communication therewith, when sleeve valve element 40 is in its lower position, by means of channel 47. Therefore, when the container is being evacuated, chamber 130 is also being evacuated.

In order to refill chamber 130 with atmospheric air, after it has been evacuated, so that it will be comparable in pressure to the pressure in a newly supplied container, a valve mechanism indicated generally at 135 is provided. This valve mechanism comprises a valve 136 mounted on a valve stem 137 and normally urged toward closed position by a spring 138. Valve 136 controls passageways 139 leading from the outer atmosphere to the interior of chamber 130. A bellows 140 is mounted on the outer end of valve stem 137 and is adapted to be supplied with compressed air through a conduit 141, at the proper time as described below, to open valve 136 against the action of spring 138. A stop 142 on valve stem 137 controls or limits the throw of the valve to open position.

Returning to the connecting rod 122 supported between the diaphragms 120 and 121 and referring to Figs. 7 and 10, it will be seen that the connecting rod is secured to a lever 145 which is pivotally secured at its lower end. At its upper end lever 145 is provided with a pin 146 which extends into a double collar arrangement, adjustably supported on a rod 147. Rod 147 is supported by a bracket 148 and carries a soft iron armature 149 at its right-hand end, as seen in Fig. 7. A permanent magnet 150 is adjustably supported by a bolt or screw 151 adjacent the soft iron armature of rod 147 and is adapted to normally maintain the rod in its right-most position. A spring 152, supported between a collar 153 on the rod and one arm of bracket 148, normally urges the rod in the opposite direction, that is, toward the left, as seen in Fig. 7. A second spring 154, which is adjustable, is connected to turn lever 145 in a counterclockwise direction or in other words, to move its upper end towards the left as seen in either figure. The force exerted by the magnet combined with the force exerted by diaphragm 121, through connecting rod 122 and lever 145, on rod 147 by reason of the vacuum maintained in the chamber to the right of the diaphragm, is slightly greater than the combined force normally exerted by the two springs and therefore an extra force acting towards the left is needed in order to move rod 147 in that direction. This extra force is provided through connecting rod 122 by diaphragm 120 when the pressure in the chamber enclosing the left-hand side of this diaphragm is reduced to a predetermined degree. A limit switch LS10 is adapted to be operated by rod 147 when the rod is so moved to the left.

The operation of the vacuum regulating device is briefly as follows: A container 1 is placed on platform 14 of the hydraulic lift mechanism and is raised thereby until it is connected by the pressure-tight coupling 32 to the valve chamber 31 of the valve block. Its valve 6 is then opened by rod 48, the sleeve or piston-type valve 40 being already in its lower position as a result of a previous operation of the apparatus. The valve in evacuating passageway 51 of the valve block is then opened and the evacuation of the container begun through an evacuating line therefor made up of passageways 45 and 46 of valve 40, the central opening 34 of the coupling device, and the valve controlled opening of the container. At the same time, evacuation of chamber 130 of the vacuum regulating device is begun through an evacuating line therefor made up of annular channel 47 of valve 40, conduit 133, check valve 134, and needle valve 132. When the pressure within chamber 130 has been reduced to a predetermined degree, as previously stated, rod 147 will be moved to the left to close limit switch LS10, which indirectly causes the closing of the valve in passageway 51 of the valve block as will be subsequently described. It is desirable that this closing of limit switch LS10 and the consequent closing of the valve in passageway 51 be effected when the degree of vacuum obtaining in the container is about 1" of mercury absolute. This is possible by the proper adjustment of the regulating device.

The degree of vacuum provided by the vacuum pump is substantially constant. The purpose of the vacuum regulating device described is to assure that a container is evacuated to a constant predetermined degree, and to prevent continued operation of the filling apparatus to fill the container if, due to a leak in the container or the coupling, the container is not evacuated to that degree. The effective frictional resistance of the aforementioned evacuating line for the container is constant. That of the aforementioned evacuating line for chamber 130 may be varied by adjusting needle valve 132. The needle valve is set so that the frictional resistance of the evacuating line for chamber 130 is so related to the frictional resistance of the evacuating line for the container that the pressure within chamber 130 is reduced to the degree necessary to cause the closing of limit switch LS10 at the same time that the pressure within the container is reduced to the desired predetermined degree. If because of a leak in the container or the coupling between the container and the valve chamber, the degree of vacuum drawn in the container does not reach the desired value, then the degree of vacuum drawn in the chamber 130 will not reach a value sufficient to move rod 147 to the left to close limit switch LS10. For that reason, the container evacuating operation of the apparatus will continue indefinitely, and the operator will be appraised, by means of pilot lights to be described, that the container or its coupling is faulty and will manually remove the container, reset the mechanism and start a new filling operation.

The liquid product is supplied to passageway 56 of the valve block from a metering device 160 through a conduit 161 (Fig. 10). The product metering device, as seen most clearly in section in Fig. 2, comprises an upper cylinder 162 and a lower cylinder 163. A piston 164 is reciprocably mounted in cylinder 162 on a piston rod 165, on the other end of which there is mounted a piston 166 reciprocably carried in cylinder 163. Cylinder 162 is adapted to receive a measured charge of liquid product when piston 164 is moved downwardly therein. Cylinder 163 is adapted to receive compressed air below the piston 166 to move this piston upwardly in the cylinder, thereby moving piston 164 upwardly in cylinder 162 through the agency of the common piston rod 165. An adjusting screw 167 is located at the bottom of cylinder 163 and by means of it the amount of liquid product that can be received in the upper cylinder 162 may be varied. This is so because it is the degree of retraction of piston 164 in cylinder 162 that determines the amount of liquid product that can be received by that cylinder and the retraction of piston 164 is in turn controlled by the distance piston 166 may be displaced downwardly in cylinder 163. A conduit 168 is provided for supplying compressed air to the cylinder 163 below piston 166 and for venting that cylinder subsequent to the operation of the metering device.

Referring back to Fig. 10, it will be seen that liquid product is supplied to the upper cylinder 162 of the metering device from a supply tank 169 through a conduit 170, an air-operated check valve 171, and a portion of conduit 161. Compressed air may be supplied to tank 169 through a conduit 172 to positively force liquid product from the tank to cylinder 162 of the metering device. Metering device 160 operates as follows: The valve in passageway 56 of valve block 30 is closed and compressed air cylinder 163 is vented through conduit 168. This permits liquid product to flow from the supply tank 169 through conduit 170 and check valve 171 to product cylinder 162, the product being forced out of the suply tank 169 by air supplied thereto by conduit, 172 and the pistons 164 and 166 descending under the pressure of the incoming product until piston 166 abuts the adjustable screw 167. Piston 166 is thus permitted to descend a predetermined distance under the pressure of the incoming product and a measured charge only of liquid product is admitted to cylinder 162. When the valve in passageway 56 of valve block 30 is opened during the cycle of operation of the apparatus and compressed air is supplied to cylinder 163 through conduit 168, piston 166 and therefore piston 164 are forced upwardly, thereby expelling the measured charge of liquid product in cylinder 162 through conduit 161 and passageways 56, 55 and 50 of the valve block into the container 1. Prior to the admission of air into cylinder 163, check valve 171 will have been effectively operated to prevent liquid product being expelled from the metering device from returning to the supply tank 169.

A heat exchanger 175, as seen in Fig. 10, may be provided along conduit 170 for heating the liquid product before it is admitted to the measuring cylinder 162. The heat exchanger is supplied with hot water through conduit 176, the water being removed from it through conduit 177. Each of the conduits 176 and 177 is provided with a manually operable valve so that the heat exchanger may be used or not used, depending upon the desirability of heating or not heating the liquid product.

Referring again to Fig. 2, it will be noted that a collar 180 is adjustably supported on piston rod 165. The purpose of this collar is to close limit switch LS5 when approximately half of the charge of liquid product has been forced out of the metering device and into the container, or more ideally, when the pressure in the container has risen to about 22" of mercury absolute, due to the inflow of product. This limit switch LS5 is closed by means of a linkage mechanism 181 which is engaged by collar 180 as the collar is carried upwardly by the piston rod during the expulsion of liquid product from the metering device. A second limit switch LS7 may be seen associated with metering device 160 and is adapted to be actuated by a linkage mechanism 182 when piston 166 approaches the limit of its upward travel during the expulsion of the liquid product from the metering device. The operation of the linkage mechanisms 181 and 182, by which switches LS5 and LS7 are closed, need not be specifically described as they may take any form and it should be clear from the drawing how those shown do operate. The purpose of the limit switches will become clear subsequently when the operation of the complete apparatus is described.

A metering device 190 (Fig. 10) is provided for supplying a measured charge of propellant in liquid phase to the container 1 through valve block 30 and is connected to passageway 54 of the valve block by a conduit 191. The metering device 190, as can be most clearly seen in Fig. 2, comprises an upper cylinder 192 and a lower cylinder 193. A piston 194 is reciprocably mounted in upper cylinder 192 and is carried on one end of a piston rod 195, on the other end of which is supported a rod-like piston 196 adapted to reciprocate in lower cylinder 193. An adjusting screw 197 is mounted in the upper end of cylinder 192 and performs the same function as does adjusting screw 167 of the liquid product metering device. The upper cylinder 192 is adapted to receive compressed air above piston 194 by means of a conduit 198. This conduit is also used to vent upper cylinder 192. Lower cylinder 193 is adapted to receive a measured charge of propellant in liquid phase from a propellant supply tank 199 (Fig. 10) through a conduit 200 and check valve 201. As the volatile propellant is maintained in liquid phase in supply tank 199, it is always subject to its own vapor pressure at the prevailing temperature. The vapor pressure of one type of propellant, the use of which is contemplated, is about 40 p. s. i. gauge at room temperature, that is, at 70 to 72° F. Though this pressure would itself be sufficient to force the propellant out of the supply tank, compressed air is desirably supplied to the tank through a conduit 202 to facilitate and accelerate the removal of propellant therefrom and to force it through conduit 200 to cylinder 193, the pressure on the propellant being maintained sufficiently high so that the propellant is held in liquid phase at all times during the filling operation. An elongated packing 203 is provided around the opening at the upper end of cylinder 193, through which the upper end of rod-like piston 196 passes. This packing must be very tight in order to prevent leakage of the highly volatile propellant and thus the movement of the piston through the packing is very stiff. Therefore, the pressure of the propellant being supplied to cylinder 193 is not always sufficient to move piston 196, piston rod 195, and piston 194 upwardly. Consequently, a conduit 204 is provided to supply compressed air to cylinder 192 beneath piston 194. The pressure of the compressed air supplied by this conduit 204 is considerably less than the pressure supplied to the cylinder by conduit 198 and, in fact, is only great enough to supply the necessary force for the movement upwardly of pistons 194 and 196 when propellant is being forced into cylinder 193. This reduced pressure is maintained, when compressed air is being supplied by conduit 204, by an automatic venting device 204' which automatically vents conduit 204 when the pressure therein rises above a predetermined level. Thus the pressure of compressed air in conduit 204 is maintained constant. Both of the conduits 198 and 204 also served at appropriate times as vents for cylinder 192 on either side of piston 194.

The operation of metering device 190 (Figs. 2 and 10) is as follows: When the valve contained in passageway 54 of the valve block 30 is closed and the upper portion of cylinder 192 is vented through conduit 198 and compressed air at appropriate pressure (about 20 p. s. i.) is supplied to the lower portion of cylinder 192 through conduit 204, the propellant in liquid phase is permitted to enter cylinder 193 from supply tank 199 through conduit 200 and check valve 201 under its own vapor pressure and the pressure of the compressed air supplied to the supply tank by conduit 202. Pistons 194 and 196 are moved upwardly until the piston 194 abuts adjusting screw 197. At this point cylinder 193 is filled with a measured charge of propellant, the size of the measured charge of propellant being determined by the limiting position of piston 194, which in turn is determined by the setting of adjustment screw 197. At the proper time in the cycle of the complete apparatus, as will subsequently be described, the valve in pasageway 54 of valve block 30 will be opened, the lower portion of cylinder 192 will be vented through conduit 204 and compressed air will be supplied to cylinder 192 above piston 194 through conduit 198. The compressed air forces piston 194 downwardly in cylinder 192 and piston 196 downwardly in cylinder 193, thereby causing the measured charge of propellant in liquid phase in cylinder 193 to be expelled therefrom through conduit 191 to the valve block 30 and thence into the container 1. Check valve 201 closes and prevents any of the measured charge of propellant from returning to the supply tank 199.

As may be seen in Fig. 10, the compressed air supplied to conduit 198 of propellant metering device 190 and to conduit 168 of product metering device 160 is supplied from the same source and therefore at the same pressure. From the construction of the two metering devices it can be readily seen, however, that the pressures at which the liquid product and the propellant in liquid phase are respectively introduced into the container are different. This is understandable because it will be noted that while compressed air cylinders 163 and 192, respectively, of the metering devices are of approximately the same diameter, the product cylinder 162 is considerably larger in diameter than is the propellant cylinder 193. Thus the pressure at which the product will be expelled from cylinder 162 will be considerably less than the pressure at which the propellant in liquid phase will be expelled from cylinder 193. It has been found from experience that a pressure of around 100–200 p. s. i. gauge will be satisfactory for the introduction of the liquid product, while one of around 200–400 p. s. i. gauge is desirable for the introduction of the propellant in liquid phase.

As may be seen in Fig. 2, a collar 205 is carried by piston rod 195 of the propellant metering device 190. This collar is adapted to actuate switches LS4 and LS6, respectively, through linkage mechanisms 206 and 207. Limit switch LS4 is closed by linkage mechanism 206 when the piston rod 195 is in its uppermost position, thereby indicating that cylinder 193 is filled with a measured charge of propellant in liquid phase. Limit switch LS6 is adapted to be operated through linkage mechanism 207 when piston rod 195 is at its lowermost position, thereby indicating that the measured charge of propellant in cylinder 193 has been completely expelled therefrom. The effect of the actuation of these limit switches will be more clearly understood in the subsequent description of the operation of the complete apparatus.

The compressed air operated check valves 171 and 201 are disclosed more fully in Fig. 11. Each comprises a housing structure 210 in which there is reciprocably mounted a piston 211. Compressed air is supplied to one side of piston 211 through a conduit 212. The flow of fluid that is to be checked by the valve enters a passageway 213 of the valve at either end thereof and leaves at the other. Passageway 213 is formed with a valve seat 214, a valve 215 which is to seat thereon being carried by the piston 211. A compression spring 216 is provided to normally maintain piston 211 at the lower end of the compressed air chamber of the valve, as seen in the drawing, and is aided in this respect by the fluid, the flow of which is to be checked, which may enter a bellows 217 through a passageway 218. The operation of the valve will be clear, that is, when compressed air is admitted to housing 210 through conduit 212, piston 211 is urged upwardly therein against the action of spring 216 and cuts off the flow of fluid through passageway 213 by seating valve 215 on valve seat 214. The necessity for such a positively operated check valve is occasioned by the high pressures involved in the supply of both the liquid product and the propellant in liquid phase to the valve block 30 and thence to the container 1.

By reference to Fig. 10, the means for supplying compressed air to the various components of my complete filling apparatus will be described. A supply conduit 220 carries air from a compressor or other source therefor (not shown) to a manifold 221 which is labelled "Uncontrolled Air." By this is meant merely that air supplied from this manifold to any part of the apparatus is continuously supplied. Compressed air from the uncontrolled air manifold is supplied by conduits 172 and 202, respectively, to the product supply tank 169 and the propellant supply tank 199, as previously described, and to the lower end of the compressed air cylinder 192 of the propellant metering device 190 by conduit 204, as also previously described. An air reduction valve 222 is placed in conduit 204, however, to reduce the pressure of the air therein for, as was stated above, the air supplied to the propellant metering device through conduit 204 need only be of a pressure of approximately 20 p. s. i. gauge and air supplied to the uncontrolled air manifold 221 is normally of a pressure somewhat above 100 p. s. i. gauge. Compressed air is also supplied from the uncontrolled air manifold 221 to a pair of electro-pneumatic three-way valves 223 and 224 through conduits 225 and 226, respectively. Three-way valve 223 controls the flow of air to the hydraulic lift mechanism, while three-way valve 224 controls the supply of air to the cam shaft indexing mechanism. Both of the three-way valves are identical in structure and therefore one only need be described. From the drawing it can be seen that three-way valve 223 comprises a body portion 227, having a valve chamber 228 therein in which there is positioned a valve 229. Leading from the valve chamber are three passageways, one to conduit 23 through which air is carried to the hydraulic lift mechanism, a second to conduit 225 through which compressed air is supplied to the valve chamber and a third 230, operating as a vent. When valve 229 is in its upper position, as shown, compressed air may flow through the valve from conduit 225 to conduit 23. However, when valve 229 is in its lower position, the passageway leading into the chamber from conduit 225 is effectively sealed off and air within the hydraulic lift mechanism may escape therefrom through conduit 23 and vent 230 of the valve. A spring 231 normally maintains valve 229 in its lower position and an electromagnet 232 is provided to move it to its upper position, against the action of the spring, at the appropriate time. The operation of three-way valve 224 is the same, that is, in one position it supplies air to the cam shaft indexing cylinder and in the other position it acts as a vent for this cylinder.

For the operation of the metering devices 160 and 190 and for the operation of the check valves 171 and 201, respectively associated therewith, a non-continuous supply of compressed air is necessary. This is provided from a compressed air manifold 235 which is labelled in Fig. 10 as "Controlled Air." Air is supplied to this manifold through the valve block 30 from the uncontrolled air manifold 221. When the cam actuated valve in passageway 66 of the valve block is opened during the operation of the apparatus, air supplied to the passageway from the uncontrolled air manifold through a conduit 236 passes through the passageway and through conduit 237 to the controlled air manifold 235. When this occurs, air is supplied from manifold 235 to check valves 171 and 201 by conduits 238 and 239, respectively. Controlled air manifold 235 is also the source of compressed air supplied to the compressed air cylinders 163 and 192 of the metering devices through conduits 168 and 198, respectively. The compressed air from the manifold is supplied to these two conduits through conduit 240 in which there is placed a simple delaying device 241. This device comprises a cylinder in which there is a piston 242 urged by a spring 243 toward the end of the cylinder to which air is supplied from the manifold. Conduit 240 leads from the cylinder of the delaying device midway between its ends and thus when piston 242 is urged away from the end of the cylinder, to which the air is being supplied, a sufficient distance, air will pass into conduit 240 from within the cylinder of the delay device. The delaying device thus provides a period of time during which compressed air is supplied to the check valves 171 and 201 before it is supplied to the metering devices, thereby providing assurance that the check valves will be closed prior to the beginning of the charging operations of the metering devices. A vent 244 is provided so that when piston 242 returns to its normal position, conduit 240 may be vented.

The controlled air manifold 235 is itself vented through the valve block 30 when the valve contained in passageway 68 of the block is opened. The opening of this valve occurs, as will be subsequently described, at the end of each operating cycle of the apparatus.

A commutator 250 (Figs. 1, 10 and 14) is provided for the electric system of the apparatus and has seven pairs of electrical contacts, the terminal of each pair being designated respectively C1 through C7, as indicated in Figs. 1 and 10 on the terminal board 251. This commutator is of a known design, having two discs of insulating material normal to the cam shaft for supporting the contacts, one contact of each pair being supported on one disc and the other being supported opposite it on the other disc. It also has a bridge or contacting member (not shown) which sequentially connects the pairs of contacts C1—C7. This bridge or contacting member is fixedly mounted on cam shaft 69 between the contact supporting discs and therefore rotates with the cam shaft between the discs. The pairs of contacts and the contacting members are so arranged that a pair of contacts is connected by the contacting member at each of the six positions or stations of the cam shaft and the seventh pair of contacts C7 (as will be explained below) is momentarily connected as the contacting member is moved from station 5 at which it connects the contacts of pair C5 to station 6 at which it connects the contacts of pair C6.

An across-the-line circuit diagram for the electrical, or electrically operated, parts of the apparatus is shown in Fig. 14. It shows two main circuits supplied with current from main lines 260 and 261 through switches S1 and S2. For the operation of the apparatus, switches S1 and S2 are normally closed. The subcircuit controlled by switch S1 is that which controls the operation of all of the mechanisms of the apparatus with the exception of the hydraulic lift mechanism. This latter mechanism is controlled independently by the subcircuit controlled by switch S2. The various circuits shown in the circuit diagram will be more fully discussed below in the description of the operation of the apparatus. As the circuits are simple, a separate tracing of each is not necessary.

The operation of my apparatus to fill a pressure-tight container with a volatile propellant and a liquid product to be propelled will now be described. For this purpose reference may be made to Figs. 10, 12 and 14 of the drawings. The condition of the apparatus after the completion of one container filling cycle is as follows: Switches S1 and S2 are closed, and the pair of contacts C6 of the commutator are connected by the commutator bridge member. The commutator is at station 6 (Fig. 12). With the electrical portion of the apparatus in this condition and with the hydraulic lift platform 14 in its lowermost position, the apparatus is prepared to fill another container.

A container 1 is placed upon platform 14 of the hydraulic lift in proper position for filling. This closes the normally open limit switch LS9, which completes a circuit, through the coil of the relay R2. Energization of relay R2 completes a circuit through its front contact 285 and electromagnet of pneumatic valve 223. Valve 223 is thus actuated to permit the supplying of air to cylinder 17 of the hydraulic lift through conduit 23, which causes the platform 14 of the lift, and the container supported thereby, to be lifted upwardly toward the valve block 30 and the coupling device 32. As the platform 14 of the lift approaches its uppermost position, that is, the position in which the container is coupled in seal-tight condition to valve chamber 31 of the valve block by coupling 32, limit switch LS3 (Fig. 1) is momentarily closed. During the upward movement of platform 14, however, limit switch LS9 opens because the container 1 is raised out of contact with the operating linkage therefor. The circuit through the coil of relay R2 is maintained by the second front contact 286 of this relay which closes a holding circuit around limit switch LS9.

When limit switch LS3 is thus closed by platform 14, it completes a circuit through the coil of relay R1 including the connected pair of contacts C6 of the commutator, the limit switch LS1 which is closed by bell crank 109 of the cam shaft operating mechanism in its initial position, and the limit switch LS2 which is normally closed and adapted to be opened only at the end of an operating stroke of the cam shaft indexing mechanism. The energization of the coil of relay R1 closes a circuit through one of its front contacts 287 and the electromagnet of three-way valve 224. The three-way valve 224 is thus operated to supply air to cylinder 104 of the cam shaft indexing mechanism, thereby causing such mechanism to index the cam shaft through 60 degrees to station 1. In doing so, however, limit switch LS1 is permitted to open. The circuit through the coil of relay R1 is maintained by a holding circuit through a second front contact 288 of the relay around limit switch LS1. When the cam shaft is thus indexed, the connection between the pair of commutator contacts C6 is broken and that between the contacts C1 is closed, extinguishing a pilot lamp L1 and energizing a pilot lamp L2. To avoid the breaking of the circuit through the coil of relay R1 because of this, a third front contact 289 completes an auxiliary circuit around switch LS3 and contacts C6. Therefore, the coil of relay R1 is maintained energized until the bell crank of the cam shaft indexing mechanism reaches its limit of travel in this indexing operation and breaks the circuit through the coil of relay R1 by opening the normally closed limit switch LS2. This initial indexing of the cam shaft from station 6 to station 1, as may be seen in the table of operation (Fig. 12) causes container valve operating member 48 to be urged downwardly by cam 71, thereby opening valve 6 of the container, and causes the valve controlling the evacuating passage 51 of the valve block to be opened by cam 72 and its accompanying rocker arm. With the container valve open and the evacuating passageway valve open, the container is evacuated through conduit 116 and reservoir and separator 117 by the vacuum pump 115. At the same time chamber 130 of the vacuum regulating device is evacuated through needle valve 132, conduit 133, check valve 134 and the valve block. When chamber 130 of the vacuum regulating device and therefore container 1 have been evacuated to the predetermined desired degree, for instance, 1″ of mercury absolute, the vacuum regulating mechanism operates as described to close limit switch LS10.

The closing of limit switch LS10 completes a second circuit through the coil of relay R1 if limit switch LS4, associated with the propellant metering device 190 is closed, indicating that a measured charge of propellant in liquid phase is contained in the propellant cylinder of such metering device. The closing of this circuit energizes the coil of relay R1 in the same manner as was above described and this causes the cam shaft indexing mechanism to again be operated in the manner above described and turned to station 2. At station 2, the contacts C1 are opened, the contacts C2 are closed, the pilot lamp L2 is deenergized and the lamp L3 is energized. The indexing of the cam shaft to station 2, as is indicated in Fig. 12, accomplishes the closing of the evacuating passageway valve in the valve block, the movement upwardly of sleeve valve 40 of the valve block by means of cam 70 and its accompanying rocker arm, the opening of the product valve in passageway 56 of the valve block by cam 74 and the opening of the compressed air valve in passageway 66 of the valve block by cam 75. The upward motion of sleeve valve 40 prepares the valve block for the introduction into the container of liquid product and propellant in liquid phase. The opening of the compressed air valve in passageway 66 of the valve block permits the supplying of compressed air to the controlled air manifold 235 and thence through conduits 238 and 239 to the check valves 171 and 201 associated with the metering devices. Additionally, compressed air is thereby supplied to the air cylinders 162 and 192, respectively, of the product and the propellant metering devices, this being so, of course, only after the delaying device 241 operates to permit it. The delay provided in the supplying of air to the metering devices assures the closing of check valves 171 and 201 prior to the beginning of the expulsion of either the product or the propellant from its metering device. As the valve in the product passage 56 of the valve block is open at this time, the product metering device will begin to function immediately to expel the measured charge of product therefrom through conduit 161 and the valve block into the container. The propellant metering device will not begin to function because the valve in propellant passageway 54 in the valve block is not yet open. However, when, as previously described, approximately half of the measured charge of liquid product has been expelled from the product metering device, or ideally, when, because of the admission thereinto of liquid product, the pressure within container 1 has risen to about 22″ of mercury absolute, limit switch LS5 is closed by switch actuating member 180, carried by piston rod 165 of the product metering device. The closing of limit switch LS5 completes a circuit through the coil of relay R1, including the pair of commutator contacts C2 which are connected by the commutator bridge member as a result of the previous indexing of the cam shaft to station 2.

The energization of the coil of relay R1, again as described, effects an indexing of the cam shaft by the cam shaft indexing mechanism to station 3, disconnecting the contacts C2 and connecting the contacts C3, thereby deenergizing the pilot lamp L3 and energizing the lamp L4. Referring again to Fig. 12, it will be noted that this indexing of the cam shaft opens the valve in propellant passageway 54 of the valve block. Thus the propellant metering device is permitted to function and the measured charge of propellant in liquid phase is forced into the container 1 through the valve block. It will be noted from Fig. 8 that the propellant and product are mixed in passageway 50 of the valve block prior to their admission into the container 1. In view of the fact that the amount of liquid product that is to be supplied to the container is at least several times as great as the amount of volatile propellant to be supplied thereto, the time required for the operation of the propellant metering device 190 is considerably less than that for the product metering device 160. Thus, even through the introduction of propellant in liquid phase to the container is started after the start of the introduction of the liquid product thereto, the completion of the introduction of the propellant is accomplished prior to the completion of the introduction of the liquid product. When the operation of the propellant metering device is completed limit switch LS6 is closed.

The closing of limit switch LS6 again causes the energization of the coil of relay R1 through a circuit including the commutator contacts C3 which have been connected by the indexing of the cam shaft to station 3, and a circuit is thus completed through the coil of relay R1. Thus, the cam shaft is indexed to station 4, disconnecting the contacts C3 and connecting the contacts C4, whereby the pilot lamp L5 is energized and the lamp L4 deenergized. By reference to Fig. 12, it will be noted that this indexing to station 4 merely effects the closing of the valve in propellant passageway 54 of the valve block.

The product metering device 160 continues in its operation until all of the measured charge of liquid product has been forced out of it. At this point piston 166 thereof effects the closing of limit switch LS7 through linkage mechanism 182 (Fig. 2). This again completes a circuit through the coil of relay R1, including connected commutator contacts C4, and the cam shaft is indexed to station 5 disconnecting the contacts C4 and connecting the contacts C5 whereby the pilot lamp L5 is deenergized and the lamp L6 is energized. At station 5, the valve in product passageway 56 of the valve block is closed by cam 74. Also, the piston type sleeve valve 40 in valve chamber 31 is permitted to move downwardly under the pressure of spring 88 by cam 70. This places valve 40 in position for the next operation of the apparatus to fill a subsequent container. The valve in compressed air passageway 66 in the valve block is also closed by cam 75 during indexing of the cam shaft to station 5 and the supply of compressed air to the controlled air manifold 235 is thereby cut off. At the same time the valve in vent passageway 68 of the valve block is opened by cam 76, thereby venting the controlled air manifold and consequently the two air operated check valves 171 and 201 whereby these check valves are permitted to open, whereupon the product and propellant metering devices are both filled in preparation for the next operation of the apparatus. The liquid product is forced into the product cylinder 162 by the air pressure in the product tank 169. The propellant is forced into the propellant cylinder by the air pressure in the propellant tank 199 when the controlled air pressure on the upper face of the piston 194 is vented by opening of the valve in vent passageway 68, the friction on the propellant piston being overcome by the uncontrolled air pressure on the lower face of the piston 194. When the propellant cylinder 193 is filled, the limit switch LS4 is closed. The connecting of commutator contacts C5 again completes an energizing circuit through the coil of relay R1 (Fig. 14) to index the cam shaft to station 6, in which contacts C5 are disconnected, contacts C6 are connected, lamp L6 is deenergized and lamp L1 is energized.

The last indexing of the cam shaft from station 5 to station 6 causes cam 71 to permit container valve operating member 48 to rise under the pressure of spring 88, in turn permitting the valve 6 of the container to close (see Fig. 12). When the contacts C6 are connected, the cycle of operation of the apparatus is completed and the apparatus is in condition to receive and fill another container. During the movement of the bridge member from contacts C5 to contacts C6, the commutator contacts C7 are momentarily connected. As may be seen from the right-hand subcircuit of Fig. 14, the connecting of commutator contacts C7 energizes the coil of a relay R3, causing its back contacts 288' to break the circuit through the coil of relay R2. This is effective to deenergize the magnet of pneumatic valve 223, thereby permitting the platform 14 of the hydraulic lift to descend and the container to be uncoupled from the valve block. If necessary or desirable, the apparatus may be manually operated by means of the manual switches designated PB1, PB2 and PB3. For manual control, the commutator contacts C1-C7 inclusive are disconnected from the circuit. Then when a container is placed on the platform 14, the manual switch PB2 is closed to energize the operating coil of the relay R2 and so lift the platform and the container to filling position. When the container is so raised, the operator closes the manual switch PB1, thereby energizing the coil of the relay R1 through a circuit including the switches LS1 and LS2 and thus indexing the cam shaft 69 from station 6 to station 1. Pilot lamp L1 is energized when switch PB1 is closed, since the limit switch LS3 is closed when the platform 14 is in the upper position. The successive indexing of the cam shaft 69 to its other stations is thereafter accomplished by successively closing the switch PB1, the operations of the apparatus at the several stations being as described above. When station 6 is reached, the poerator lowers the container platform 14 by opening the manual switch PB3, thus deenergizing the coil of the relay R2 and so deenergizing the solenoid of the platform control valve 223.

As stated at the outset of this description, apparatus may also be provided, when desirable, to heat the liquid product prior to its introduction into the container and apparatus may also be provided to superheat a portion of the measured charge of propellant to superheated gaseous phase and to introduce it into the container after the completion of the introduction of the liquid product and the propellant in liquid phase.

Product heating may be accomplished by a heat exchanger 175 (Fig. 10), inserted in the product conduit 170 leading from the supply tank 169 to the product cylinder of metering device 160. The valves 290 and 291 in the heating water inlet and outlet pipes 176 and 177 of the heat exchanger may be employed to control the supply of heat. By heating the liquid product, the mixture of liquid product and volatile propellant, established in passageway 59 of the valve block 30, is heated above the prevailing temperature, thereby increasing the pressure of the propellant in the mixture and causing more thorough mixing and a greater rapidity in the flow of the mixture to the container. The same holds true for the mixture when it arrives in the container, that is, its temperature is above the prevailing temperature, the pressure of the propellant is greater, and therefore the propellant is more thoroughly mixed with the liquid product. Assuming that the prevailing temperature at which the filling operation takes place is room temperature, that is, about 70-72° F., a satisfactory temperature to which the liquid product may be heated by the heat exchanger 175 is approximately 90° F.

The apparatus by which a portion of the measured charge of propellant may be heated to superheated gaseous phase is shown somewhat diagrammatically in Fig. 13. In describing this apparatus, those parts which are the same as parts already described will be given like numbers with distinctive exponents. The apparatus comprises a superheating gas generator indicated generally at 260, connected to passageway 49' of valve block 30' through a conduit 261 and a passageway 262 leading from passageway 49' to the face of the block. A cam operated valve of the same construction as that described in connection with Fig. 4 is contained in passageway 262 and is adapted to be opened and closed by a cam 263 mounted on cam shaft 69'. The gas generator is supplied with a portion of the measured charge of propellant in liquid phase through a conduit 264 connected to conduit 191' leading from the bottom of propellant metering cylinder 193'. The gas generator is provided with an electric heating element 265 which is maintained at a temperature considerably above the temperature at which the filling apparatus proper is operated. The filling apparatus is operated, as a general rule, at prevailing or room temperature and the heating element may be maintained at a temperature of about 250° F. The propellant in liquid phase to be superheated is supplied to the gas generator from conduit 264 through a check valve including a valve block 266 and a valve 267. Valve 267 is normally maintained seated by a spring 268, thereby preventing the flow of propellant from conduit 264 to the gas generator. However, when propellant in liquid phase is being expelled from cylinder 193' of the metering device through conduit 191', the pressure of the propellant being expelled is sufficient to open check valve 267 against spring 268. This permits the flow of propellant through valve block 266 to a conduit 269 and thence into the gas generator. Within the gas generator is a helically coiled tube 270 (actually as shown in the drawing, an extension of conduit 261 extending out of the gas generator), wound about and contacting the heating element 265 thereof. When the propellant in liquid phase is admitted to the gas generator by conduit 269, which directs it against the heated coil 270, it is immediately vaporized and its vapor builds up a relatively high gas pressure in the generator. The high gas pressure thus built up closes check valve 267, thereby preventing the admission of any more propellant in liquid phase to the generator or the return flow of gaseous propellant from the generator. In this way a limited and predetermined part of the measured charge of propellant in liquid phase is taken from conduit 191 during the operation of the propellant metering device 190. The propellant in gaseous phase thus generated is retained in the generator and in conduit 261 until the valve in passageway 262 of valve block 30 is opened by cam 263. The propellant passes to the conduit 261 through coil 270 and is thus superheated. Thus all of the propellant admitted to the gas generator is superheated before or as it leaves. The proper time for the charging of the superheated gaseous propellant into the container is after all of the liquid product and propellant in liquid phase has been charged into the container and piston type sleeve valve 40' has been moved by its cam to its lower position. This is accomplished by so designing cam 263 that it opens the valve in passageway 262 during the initial portion of the indexing of the cam shaft from station 5 to station 6 and before the container valve is closed. When the valve in passageway 262 is opened, the propellant in superheated gaseous phase is admitted to the valve chamber and instantly flows downwardly through the valve into the container, clearing the valve of the container of any liquid product remaining therein and also clearing the siphon tube 10 of the container of any of the unmixed liquid product remaining therein. This assures a more complete mixture of product and propellant and prevents the initial shot of material from the container, when it is subsequently used, from being unmixed liquid product. The primary advantage of using this final charge of propellant in superheated gaseous phase rather than merely propellant in saturated gaseous phase is that the latter might condense in passing through the valve block of the filling apparatus or in the valve of the container, thereby causing substantial loss of propellant and possible freezing of the container valve, whereas the former, because of the heat it contains, will not cool sufficient to condense, at least until it reaches the interior of the container.

By the above-described apparatus of my invention, pressure-tight containers may be rapidly filled to uniform pressures with uniform quantities of thoroughly and intimately mixed liquid products and volatile propellants. Some of the liquid products and volatile propellants with which it is contemplated to fill pressure-tight containers by this apparatus are disclosed in copending application Serial No. 125,032, filed on November 2, 1949.

A container that has been filled with a mixture of liquid product and volatile propellant 280 is shown in Fig. 9. A nozzle 281, of plastic material, is provided for the container and is slipped over the upper end of tubular member 4 of the container. A push button 282 is threaded on the upper end of valve stem 7, whereby the valve stem may be easily depressed to open valve 6 to permit the mixture to flow out of the container through the valve and nozzle 281, the push button serving also to maintain nozzle 281 in position. Spring 8 normally maintains valve 6 in closed position and therefore none of the mixture may escape from the container, except when valve 6 is positively opened by pressure applied to push button 282.

I claim:

1. Apparatus for charging a liquid product and a volatile propellant into a pressure-tight container having an opening controlled by a valve which comprises, means for opening the valve, a vacuum pump for evacuating the container, means responsive to the evacuation of the container for regulating the degree to which the container is evacuated, a metering device for introducing a measured charge of liquid product into the container through the valve controlled opening, a metering device for introducing a measured charge of propellant in liquid phase into the container through the valve controlled opening, and means responsive to the vacuum regulating means for permitting operation of the metering device only after the pressure in the container has been reduced to a predetermined degree below atmospheric pressure.

2. Apparatus for charging a liquid product and a volatile propellant into a pressure-tight container having an opening controlled by a valve which comprises, means for opening the valve, a vacuum pump for evacuating the container, means connecting the vacuum pump to the container, means responsive to the degree of vacuum in the container for closing said connecting means when a predetermined vacuum has been drawn in the container, a metering device for introducing a measured charge of liquid product into the container through the valve controlled opening, a metering device for introducing a measured charge of propellant in liquid phase into the container through the valve controlled opening, and a superheating device for introducing a charge of propellant in superheated gaseous phase into the container through the valve controlled opening after the completion of the introduction thereinto of the measured charges of liquid product and propellant in liquid phase.

3. Apparatus for charging a liquid product and a volatile propellant into a pressure-tight container having an opening controlled by a valve which comprises, means for opening the valve, a vacuum pump for evacuating the container, means connecting the vacuum pump to the container, means responsive to the degree of vacuum in the container for closing said connecting means when a predetermined vacuum has been drawn in the container, a metering device for introducing under pressure a measured charge of liquid product into the container through the valve controlled opening, and a metering device for introducing a measured charge of propellant in liquid phase into the container through the valve controlled opening during the period of introduction of the liquid product and at a pressure substantially greater than the pressure of introduction of the liquid product.

4. Apparatus for charging a liquid product and a volatile propellant into a pressure-tight container having an opening controlled by a valve which comprises, means for opening the valve, a vacuum pump for evacuating the container, means for regulating the degree to which the container is evacuated, a metering device for introducing a measured charge of liquid product into the container through the valve controlled opening, a metering device for introducing a measured charge of propellant in liquid phase into the container through the valve controlled opening, and a heat exchanger to heat the liquid product supplied by the liquid product metering device.

5. Apparatus for charging a liquid product and a volatile propellant into a pressure-tight container having an opening controlled by a valve which comprises, a valve block having a valve chamber therein, pressure-tight coupling means supported by the valve block for connecting said valve chamber to the container opening, means in said valve chamber for opening the container opening valve when the container is connected to the valve chamber by the coupling means, a vacuum pump for evacuating the container through said valve chamber and through the container opening, means for regulating the degree to which the container is evacuated, a metering device for introducing under pressure a measured charge of liquid product into the container through said valve chamber and said container opening, a metering device for introducing under pressure a measured charge of propellant in liquid phase into the container through said valve chamber and said container opening, and means responsive to the vacuum regulating means for permitting operation of the metering device only after the pressure in the container has been reduced to a predetermined degree below atmospheric pressure.

6. Apparatus for charging a liquid product and a volatile propellant into a pressure-tight container having an opening controlled by a valve which comprises, a valve block having a valve chamber therein, pressure-tight coupling means supported by the valve block for connecting said valve chamber to the container opening, means in said valve chamber for opening the container opening valve when the container is connected to the valve chamber by the coupling means, an evacuating passageway leading from the valve chamber to the face of the valve block, a second passageway leading from the valve chamber and having a pair of branch passageways leading to the face of the valve block, a piston type valve reciprocably mounted in said valve chamber and adapted in a first position to seal off the evacuating passageway from the chamber and in a second position to seal off said second passageway from the valve chamber, means for evacuating the container through its valve controlled opening and through the evacuating passageway and valve chamber of the valve block when the piston type valve is in said second position, means for regulating the degree to which the container is evacuated, said means being in communication with the valve chamber by a passageway in the valve block when the piston-type valve is in said second position, a metering device for introducing under pressure a measured charge of liquid product into the container through a branch of said second passageway when the piston type valve is in said first position, and a metering device for introducing under pressure a measured charge of propellant in liquid phase into the container through the other branch passageway in the valve block during the introduction of the liquid product.

7. Apparatus according to claim 6 which includes a cam actuated mechanism for moving the piston-type valve from one position to the other position in the valve chamber and for actuating the means in the valve chamber for opening the valve in the container opening.

8. Apparatus according to claim 6 which includes valves in each of said evacuating passageways and said branch passageways of said second passageway, and which includes cam operated means for opening and closing said valves.

9. Apparatus according to claim 6 in which the metering device for introducing a measured charge of liquid product into the container includes means for initiating the operation of the propellant metering device after a part of the measured charge of liquid product has been introduced into the container.

10. In apparatus of the type described for charging a liquid product and a volatile propellant into a pressure-tight container having an opening controlled by a valve, said apparatus including a source of vacuum and a conduit for evacuating the container through its valve controlled opening, means for regulating the degree to which the container is evacuated which comprises a pressure-tight chamber, a pair of diaphragms, a movable switch actuating member, a connecting rod which controls the movement of the switch actuating member, an adjustable means normally urging the connecting rod and switch actuating member toward switch closing position, said connecting rod being connected at opposite ends to said diaphragms and the sides of the diaphragms facing each other being subject to atmospheric pressure, a conduit connecting a pressure chamber enclosing the other side of one diaphragm to the vacuum source, a conduit connecting a pressure chamber enclosing the other side of the other diaphragm to the pressure-tight chamber, and a conduit connecting the pressure-tight chamber to the evacuating conduit adjacent the opening in the container, whereby when the pressure in the pressure-tight chamber has been reduced to a predetermined degree and therefore the pressure in the container has been reduced to a corresponding predetermined degree the connecting rod is moved to cause the switch actuating member to close a switch discontinuing the evacuation of the container.

11. In apparatus of the type described, a vacuum regulating means according to claim 10 which includes a needle valve in the conduit connecting the pressure-tight cylinder to the evacuating conduit adjacent the container opening, whereby the degree to which the container is evacuated prior to the effective operation of the switch actuating member to close the switch may be varied.

12. In apparatus of the type described, a vacuum regulating means according to claim 10 which includes an armature connected to the switch actuating member and a fixed magnet located adjacent thereto and adapted to attract the armature and so hold the switch actuating member in a position remote from that in which the switch actuating member moves to close the switch, whereby when the vacuum regulating means operates to move the switch actuating member the movement thereof is abruptly initiated and rapid.

13. In apparatus of the type described, a vacuum regulating means according to claim 10 which includes an air operated valve for returning the pressure in the pressure-tight cylinder to atmospheric after the regulator has been operated.

14. In apparatus of the type described for charging a liquid product and a volatile propellant into a pressure-tight container having a valve controlled opening and including a metering device for introducing a measured charge of propellant in liquid phase into the pressure-tight container, a metering device for introducing under pressure a measured charge of liquid product into the pressure-tight container through the valve controlled opening which comprises a product cylinder and a power cylinder aligned therewith, pistons reciprocably mounted in said cylinder, a piston rod connecting said pistons whereby the movement of one piston causes the movement of the other, a product supply conduit leading into the product cylinder beyond the piston therein from a product supply tank, a compressed air conduit leading into the power cylinder beyond the piston therein from a source of compressed air, an adjustable stop member in the outer end of the power cylinder to limit the outward movement of the piston therein, whereby the limit of inward movement of the piston in the product cylinder may be varied to vary the size of the charge of liquid product that can be received thereby, a switch the closing of which permits the initiation of the operation of the metering device for introducing the charge of propellant in liquid phase into the container, and an adjustable switch actuating member mounted on the connecting piston rod to close said switch at a predetermined time during the operation of the metering device for introducing the charge of liquid product into the container.

15. In apparatus of the type described for charging a liquid product and a volatile propellant into a pressure-tight container having a valve controlled opening and including a compressed air operated metering device for introducing a measured charge of liquid product into the container through the valve controlled opening, a metering device for introducing a measured charge of propellant in liquid phase into the container through the valve controlled opening which comprises a propellant cylinder and a power cylinder aligned therewith, said propellant cylinder being of substantially smaller diameter than the power cylinder, pistons reciprocably mounted respectively in the cylinders, a piston rod connecting said pistons whereby the movement of one piston causes the movement of the other piston, a propellant supply conduit leading into the propellant cylinder beyond the piston therein from a propellant supply tank, a compressed air conduit leading into the power cylinder beyond the piston therein from a source of compressed air, a second compressed air conduit leading into the power cylinder inside the piston therein, said second compressed air conduit including a pressure reduction means, and an adjustable stop member in the outer end of the power cylinder to limit the outward movement of the piston therein, whereby the limit of the inward movement of the piston in the propellant cylinder may be varied to vary the size of the charge of propellant in liquid phase that can be received thereby.

16. Apparatus according to claim 15 in which the metering device for introducing the measured charge of propellant in liquid phase into the pressure-tight container includes an air operated check valve in the propellant supply conduit, said valve being adapted to be supplied with air from the same source as is the compressed air conduit leading to the power cylinder outward of the piston therein, a conduit leading to the container to be filled from a point in the propellant supply conduit between the check valve and the propellant cylinder, and a device in said compressed air conduit leading to the power cylinder outward of the piston therein which delays the supplying of compressed air to said cylinder for a time sufficient to assure that the air operated check valve has been closed prior to the admission of any air to the power cylinder.

17. In apparatus of the type described, a propellant metering device as set forth in claim 15 which includes a limit switch operable by a collar on the piston rod when the propellant cylinder of the metering device is filled with a measured charge of propellant to permit the operation of the metering device to expel the measured charge of propellant.

18. In apparatus of the type described for charging a liquid product and a propellant in liquid phase into a pressure-tight container, a device for superheating a portion of the volatile propellant to superheated gaseous phase for introduction into the container subsequent to the introduction thereinto of the liquid product and propellant in liquid phase, which comprises a gas chamber, an inlet conduit leading into said chamber for supplying thereto propellant in liquid phase, a check valve in said inlet conduit, a heating element in said gas chamber, and an outlet conduit leading out of said gas chamber, the check valve in the inlet conduit being closed when propellant in liquid phase entering the gas chamber contacts the heating element and is vaporized to a pressure greater than the pressure of the incoming propellant.

19. In apparatus of the type described, a device for superheating a portion of the volatile propellant to superheated gaseous phase according to claim 18 in which the inner end of the outlet conduit comprises a coil in contact with the heating element, whereby the inner end of said conduit is heated and propellant in order to escape from said chamber must pass through said inner end of the outlet conduit and become superheated.

20. In apparatus of the type described, a device for superheating a portion of the volatile propellant to superheated gaseous phase according to claim 18 which includes a spring for normally maintaining the check valve closed until propellant at a predetermined pressure is supplied to the inlet conduit.

21. Apparatus for charging a liquid product and a volatile propellant into a pressure tight container comprising a valve chamber, pressure tight coupling means connected to said valve chamber for connecting said valve chamber to a container, a power operated product metering device comprising power and product cylinders, pistons in said cylinders and a member connecting said pistons, a product conduit connecting said product cylinder to said valve chamber, means for supplying pressure fluid to said power cylinder to move said pistons and force a measured charge of product under pressure from said product cylinder to said valve chamber, a power operated propellant metering device comprising power and propellant cylinders and interconnected pistons in said cylinders, a propellant conduit connecting said propellant cylinder to said valve chamber, means for supplying pressure fluid to said power cylinder of said propellant metering device to move its pistons and force a metered charge of propellant under pressure from said propellant cylinder to said valve chamber, and control means including a movable member disposed at an intermediate point in the path of movement of said piston connecting member of said product metering device and operable upon movement of said movable member to initiate operation of said propellant metering device to force a charge of propellant into said valve chamber while said product metering device is forcing a charge of product into said valve chamber.

22. Apparatus for charging a liquid product and a volatile propellant into a pressure-tight container comprising a valve chamber, pressure-tight coupling means connected to said valve chamber for connecting said valve chamber to a container, a container lift adjacent said coupling means for moving a container into engagement with said coupling means, a source of vacuum, a conduit connecting said vacuum source to said valve chamber, a valve in said vacuum conduit, a vacuum responsive device connected to said vacuum conduit and operable to close said vacuum valve when a predetermined vacuum is drawn in such conduit, control means including a movable element disposed in the path of movement of said container lift and acting upon movement by said container lift to open said vacuum conduit valve and so initiate evacuation of a container, a power operated product metering device comprising power and product cylinders, pistons in said cylinders and a member connecting said pistons, a product conduit connecting said product cylinder to said valve chamber, means for supplying pressure fluid to said power cylinder to move said pistons and force a measured charge of product under pressure from said product cylinder to said valve chamber, control means responsive to said vacuum conduit valve closing operation of said vacuum responsive device to initiate product charging operation of said product metering device, a power operated propellant metering device comprising power and propellant cylinders and interconnected pistons in said cylinders, a propellant conduit connecting said propellant cylinder to said valve chamber, means for supplying pressure fluid to said power cylinder of said propellant metering device to move its pistons and force a metered charge of propellant under pressure from said propellant cylinder to said valve chamber, and control means including a movable member disposed at an intermediate point in the path of movement of said piston connecting member of said product metering device and operable upon movement of said movable member to initiate operation of said propellant metering device to force a charge of propellant into said valve chamber while said product metering device is forcing a charge of product into said valve chamber.

23. In apparatus of the type described for charging a liquid product and a propellant in liquid phase into a pressure-tight container having a valve controlled opening, a metering device for introducing under pressure a measured charge of liquid product into the pressure-tight container through the valve controlled opening which comprises a product cylinder and a power cylinder in alignment therewith, a piston reciprocably mounted in each cylinder, a piston rod connecting said pistons whereby the movement of one piston causes the movement of the other, a product supply conduit leading into the product cylinder beyond the piston therein from a supply tank, a compressed air conduit leading into the power cylinder beyond the piston therein from a source of compressed air, an adjustable stop member in the power cylinder to limit the outward movement of the piston therein, whereby the limit of the inward movement of the piston in the product cylinder may be varied to vary the size of the charge of liquid product that can be received thereby, an air operated check valve in the product supply conduit, said valve being adapted to be supplied with air from the same source as is the compressed air conduit leading to the power cylinder, and a conduit leading to the container to be filled from a point in the product supply conduit between the check valve and the product cylinder.

24. In apparatus of the type described, a metering device according to claim 23 which includes a device in the compressed air conduit which delays the supplying of compressed air to the power cylinder for a period of time to assure that the air operated check valve has been operatively closed prior to the admission of any compressed air to the power cylinder.

DOUGLAS M. McBEAN.

References Cited in the file of this patent

UNITED STATES PATENTS

| Number | Name | Date |
|---|---|---|
| 1,320,845 | Dayton et al. | Nov. 4, 1919 |
| 1,953,222 | Gordon | Apr. 3, 1934 |
| 2,390,694 | Coyle, Jr. | Dec. 11, 1945 |
| 2,428,598 | Weaver | Oct. 7, 1947 |
| 2,505,799 | Smith | May 2, 1950 |
| 2,505,800 | Smith | May 2, 1950 |
| 2,518,064 | Rapisarda | Aug. 8, 1950 |
| 2,536,300 | Martin | Jan. 2, 1951 |